United States Patent [19]

Morley

[11] Patent Number: 5,781,758
[45] Date of Patent: Jul. 14, 1998

[54] SOFTWARE EMULATION SYSTEM WITH REDUCED MEMORY REQUIREMENTS

[75] Inventor: John E. Morley, Kapas, Hi.

[73] Assignee: Apple Computer, Inc., Cupertino, Calif.

[21] Appl. No.: 408,845

[22] Filed: Mar. 23, 1995

[51] Int. Cl.$^6$ .................. G06F 3/00; G06F 12/00
[52] U.S. Cl. .............. 395/500; 395/421.04; 395/421.11; 395/527
[58] Field of Search ................. 395/500, 440, 395/445, 800, 650, 700, 600, 375, 411; 145, 376, 421.03, 421.11, 183.04, 705, 183.14, 587, 527, 733, 735, 505, 421.04, 421.05, 421.07, 421.08, 486, 379, 460, 406 A, 406 R, 581; 364/578, 132, 136

[56] References Cited

U.S. PATENT DOCUMENTS

| | | | |
|---|---|---|---|
| 4,638,423 | 1/1987 | Ballard | 395/500 |
| 4,638,427 | 1/1987 | Martin | 395/500 |
| 4,750,110 | 6/1988 | Mothersole et al. | 395/375 |
| 4,847,755 | 7/1989 | Morrison et al. | 395/800 |
| 4,855,905 | 8/1989 | Estrada et al. | 395/500 |
| 4,949,300 | 8/1990 | Christenson et al. | 395/500 |
| 4,951,195 | 8/1990 | Fogg, Jr. et al. | 395/500 |
| 5,127,091 | 6/1992 | Boufarah et al. | 395/375 |
| 5,167,023 | 11/1992 | de Nicolas et al. | 395/500 |
| 5,210,831 | 5/1993 | Emma et al. | 395/800 |
| 5,301,302 | 4/1994 | Blackard et al. | 395/500 |
| 5,406,644 | 4/1995 | MacGregor | 395/500 |
| 5,410,681 | 4/1995 | Jessen et al. | 395/500 |
| 5,412,799 | 5/1995 | Papadopoulos | 395/500 |
| 5,517,628 | 5/1996 | Morrison et al. | 395/375 |
| 5,561,788 | 10/1996 | Lefwin | 395/500 |
| 5,574,873 | 11/1996 | Davidian | 395/376 |

*Primary Examiner*—Jacques Louis-Jacques
*Attorney, Agent, or Firm*—Burns, Doane, Swecker & Mathis, L.L.P.

[57] ABSTRACT

Memory requirements for an emulation system are reduced by generating semantic routines on demand during emulation, rather than statically storing all routines in the body of a software emulation system. The static portion of the emulator code that is loaded into the memory of the computer comprises only one copy of each different type of semantic routine. For the emulated instruction that corresponds to the one routine stored in the emulator code, a dispatch table entry comprises a pointer to the stored semantic routine. The dispatch table entries for the other emulated instructions of the same type comprise pointers to a semantic routine generator for instructions that have the same number of operands. This semantic routine generator locates the statically stored semantic routine and makes a copy of it, substituting the appropriate operands for the desired instruction in place of those in the statically stored routine. Once this modified copy of the static semantic routine has been generated and stored in memory, its address is entered into the dispatch table, in place of the pointer to the semantic routine generator. All subsequent calls to the new instruction are then emulated by using the dynamically generated semantic routine.

13 Claims, 2 Drawing Sheets

# SOFTWARE EMULATION SYSTEM WITH REDUCED MEMORY REQUIREMENTS

FIELD OF THE INVENTION

The present invention is directed to emulation systems which execute software instructions designed for a specific instruction set on a processor which supports a different instruction set, and more particularly to the reduction of the memory requirements for emulation systems.

BACKGROUND OF THE INVENTION

The central processing unit of a computer is designed to execute a particular set of software instructions, which form the basis for the computer's operating system. Similarly, most application programs are designed to work with specific operating systems. In the past, for example, many computers were designed for complex instruction set computing, and are identified as CISC processors. Accordingly, application programs designed to run on these computers consist of commands taken from the instruction set for their processors. More recently, there has been a move toward reduced instruction set computing, so called RISC. Application programs which are designed for a CISC-based processor will not normally run on a RISC-based processor. In order to utilize these application programs on a RISC processor, it is necessary for the RISC processor to emulate the operation of a CISC processor.

The instruction set of a typical processor defines a set of basic operations that can be performed on one or more operands. The operands for an instruction are generally designated by reference to either a register within a set of registers provided by the processor architecture, or a memory location which can be identified by using a processor register to describe the address of the memory location. A software emulation that functionally implements the operation of a particular processor, for example a CISC processor, must be able to decode an instruction from the instruction set for the emulated processor and execute an equivalent sequence of instructions from the instruction set of a different processor, e.g. a RISC processor, on which the emulation is being performed. In one of the more efficient approaches to software emulation, a jump table, also known as a dispatch table, is employed to decode instructions in the emulated processor's instruction set. Generally speaking, an instruction being emulated provides an address to a location in the dispatch table. This entry in the dispatch table contains a pointer to a sequence of equivalent instructions in the instruction set for the processor. This sequence of instructions forms a semantic routine whose execution results in the desired emulation.

To minimize the amount of instruction decoding that is required during emulation, a common approach has been to design each sequence of instructions in the emulation code so that any operand information that forms part of an emulated instruction is factored into the individual routines for emulating those instructions. However, this approach can result in substantial duplication of code among routines whose only differences are the particular processor registers that form the operands for an instruction. To illustrate, an exemplary instruction for an emulated processor might be to add the contents of data stored in a first register with a constant stored in a second data register. If there are eight available data registers for each of the first and second registers that form the operands, there exist 64 variants of the basic instruction type, each with a unique encoding in the instruction set of the emulating processor. The dispatch table for the emulator will contain 64 entries that identify corresponding semantic routines for each of the 64 permutations of the two operands. Each of these 64 routines is identical, with the exception of the emulating machine registers corresponding to the original operands.

It has been observed that most software programs utilize only a small fraction of the possible instruction encodings that are available. For example, of the 64 possible code sequences described in the example above, it may be the case that only 10-12 of them would actually be executed during a typical emulation. The remaining code sequences needlessly occupy space in the main memory and/or permanent storage of the computer. However, since it cannot be predicted in advance which ones will actually be executed, all 64 must be available to the CPU, and therefore reside in memory.

It is desirable, therefore, to provide an emulation system in which the number of stored code sequences is reduced, to thereby decrease the memory requirements of the emulator.

BRIEF STATEMENT OF THE INVENTION

In accordance with the present invention, this objective of reducing memory requirements for the emulation system is achieved by dynamically generating semantic routines on demand during emulation, rather than statically storing all routines in the body of the software emulation system. To this end, the static portion of the emulator code that is loaded into the memory of the computer contains one copy of each different type of semantic routine. In the context of the present invention, all semantic routines are considered to be of the same type if they pertain to the same operation, and differ from one another only by their associated operands. Thus, the static portion of the code contains one semantic routine for a shift operation where the contents of one register are shifted by an amount stored in another register, one semantic routine for an operation where the contents of one register is added to another register, and so on.

For the specific emulated instruction that corresponds to a semantic routine that is statically stored in the emulator code, the dispatch table entry comprises a pointer to the stored routine. The dispatch table entries for the other emulated instructions of the same type, which are not statically stored, contain pointers to a semantic routine generator for instructions that have the same number of operands. This semantic routine generator locates the statically stored semantic routine and makes a copy of it, substituting the appropriate operands for the desired instruction in place of those in the statically stored routine. Once this modified copy of the static semantic routine has been generated and stored in memory, its address is entered into the dispatch table, in place of the pointer to the semantic routine generator. All subsequent calls to the new instruction are then emulated by using the dynamically generated semantic routine.

With this approach, duplicative portions of the native emulation code do not need to be stored, thereby resulting in substantial memory savings. Further features of the invention, as well as the advantages provided thereby, are described in detail hereinafter with reference to preferred embodiments illustrated in the accompanying drawings.

DETAILED DESCRIPTION

To facilitate an understanding of the present invention, it is described hereinafter with reference to its implementation in specific embodiments. In particular, the features of the invention are described in the context of an emulator system in which the instruction set of a processor designed for complex instruction set computing (CISC) is emulated by a processor which is designed for reduced instruction set computing (RISC). In this context, the instruction set for the CISC processor is identified as the "emulated code," and the instruction set for the RISC processor is labeled the "native code." It will be appreciated, however, that the practical applications of the invention are not limited to this particular embodiment. Rather, the invention will find utility in any emulator system in which a processor of one type functions as a virtual processor of another type.

Figure 1:
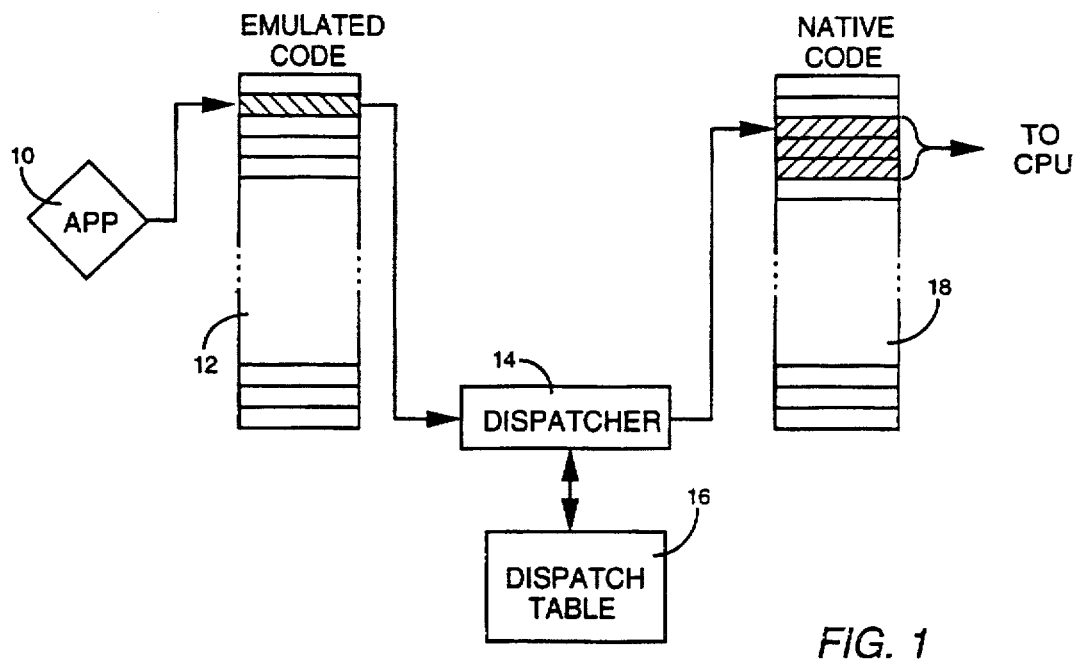
FIG. 1 is block diagram of the software components of an emulator system.

The basic operations that are carried out in an emulator are illustrated in the block diagram of FIG. 1. The blocks in this diagram represent different items of software that are stored in the memory of the computer which is functioning as an emulator. Referring to FIG. 1, an application program 10 consists of commands that are designed for the instruction set of the emulated processor, in this case the CISC processor. In FIG. 1, the complete set of instructions for the emulated processor are represented by a list 12. In practice, the application program issues individual instructions for execution by the computer's CPU. For example, the instructions might be issued in response to user inputs. A particular instruction to be emulated by the processor is forwarded to a dispatcher 14. Associated with the dispatcher is a dispatch table 16, which contains pointers to sequences of instructions in the native code 18 that functionally correspond to each of the emulated code instructions. In response to information obtained from the dispatch table, the dispatcher 14 calls one or more corresponding instructions in the native code. The processor, in this case the RISC processor, executes the called instruction(s), and thereby emulates the operation of the CISC processor. In the particular example illustrated in FIG. 1, a single instruction issued by the application program 10 results in the execution of three consecutive instructions in the native code (represented by the shaded areas). This set of three instructions in the native code which emulates the instructions in the emulated code is referred to as a "semantic routine."

In an effort to optimize execution speed, it is possible to design and statically store a semantic routine for each possible instruction in the emulated code, which takes into account operand information encoded in the instruction. In other words, a different semantic routine can be statically generated and stored for each combination of operands that is possible for each instruction. It will be appreciated that this approach results in an emulation code of appreciable size, which requires a significant amount of storage space in both the permanent storage, e.g. hard disk, and the main memory of a computer.

In practice, not all of the possible permutations of an instruction are regularly employed during a typical emulation. As a result, much of the required storage space is unnecessary. In accordance with the present invention, the actual memory usage of the emulation system can be significantly reduced by dynamically generating semantic routines as needed, rather than statically storing them at all times.

To illustrate the implementation of the invention, an exemplary instruction for a CISC-based processor will be discussed. Specifically, the instruction for logically shifting the contents of a data register to the left by the number of bit positions specified in another data register can be expressed as follows:

ls1.1 %dx, %dy where the terms %dx and %dy specify data registers, and the variables x and y represent a digit in the range of 0 to 7 inclusive. Since the variables x and y can each independently represent eight possible values, there are 64 different variations of the basic shift instruction, each having a unique encoding in the instruction set of the emulated code. The dispatch table 16 contains 64 entries that respectively correspond to each of the 64 permutations of the shift instruction.

Figure 2:
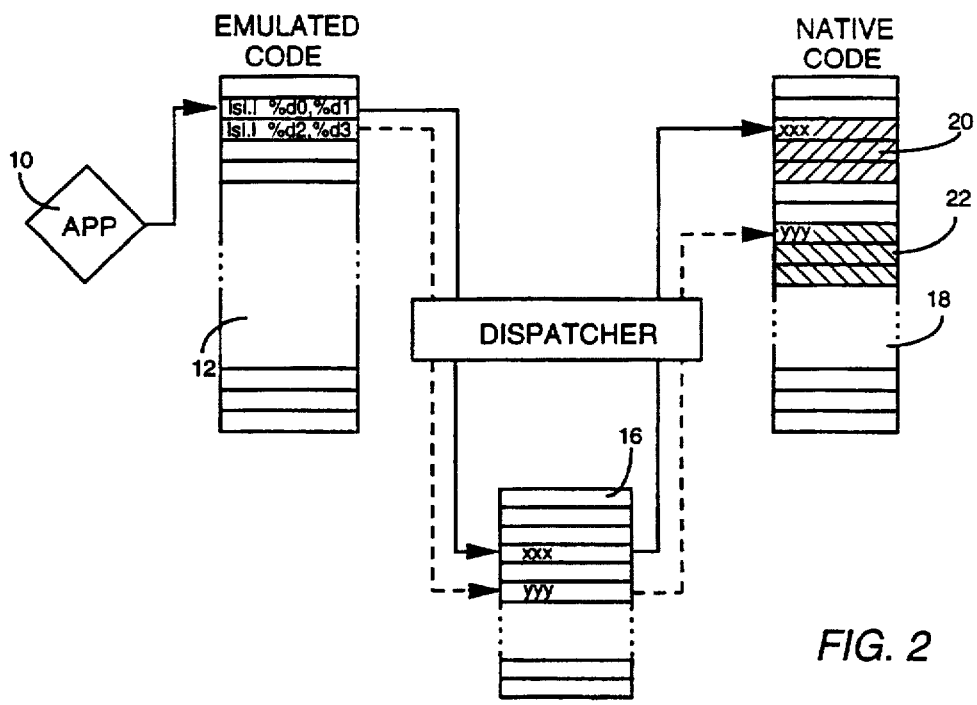
FIG. 2 is a block diagram illustrating an example of the storage of information in accordance with the present invention.

The semantic routines that respectively emulate each of the 64 emulated code instructions are identical, with the exception of the processor registers that correspond to %dx and %dy. In accordance with the present invention, the 64 semantic routines which respectively correspond to the 64 emulated instructions are not statically generated to form part of the native code 18 that is stored in the computer. Rather, the native code contains only one semantic routine for each generic type of instruction. For example, with reference to FIG. 2, the semantic routine for the shift instruction which has register 0 as its first operand and register 1 as its second operand can be statically generated and stored as part of the native code 18. The emulated code instruction for this particular example is:

ls1.1 %d0, %d1

The entry in the dispatch table 16 which corresponds to this particular instruction contains a pointer to the statically generated semantic routine that is stored in the native code. In the particular example of FIG. 2, the pointer refers to memory location xxx, and the semantic routine is represented by the shaded sequence of instructions 20.

The dispatch table entries for all of the remaining 63 variations of this instruction comprise pointers to a semantic routine generator for instructions having two register operands. Thus, for example, if the application program issues the command ls1.1 %d2, %d3 the dispatch table entry for this instruction points to a memory location yyy where the first instruction of the semantic routine generator 22 is stored. Accordingly, this routine is executed in response to the command, as depicted by the dashed line arrows in FIG. 2.

Figure 3:
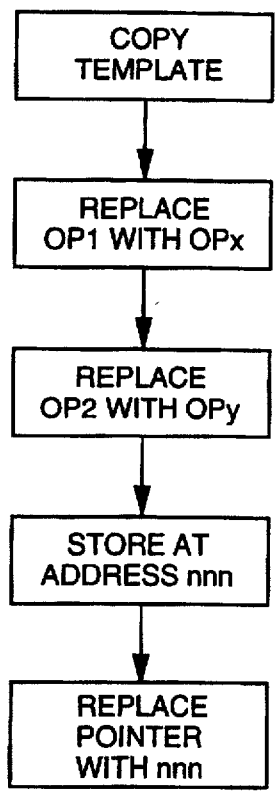
FIG. 3 is a flowchart of the operation of the semantic routine generator.

The operation of the semantic routine generator is depicted in the flowchart of FIG. 3. When called, the semantic routine generator locates the statically generated semantic routine stored at address xxx, which functions as a template, and makes a copy of it. Any suitable approach can be employed to locate the statically stored semantic routine. For example, the operation code of the emulated instruction can be stored in a register and be used to identify the location of the statically stored routine of interest.

More particularly, in a typical instruction set, each instruction is represented by a unique numerical value, known as its operation code, or opcode. For example, a four-digit opcode might be employed, in which the first two digits identify the operation and the latter two digits indicate the operands. Thus, the instruction "ls1.1 %d0 %d1" might have an opcode of "2501", where the value 25 represents a logical shift left operation, and the digits "0" and "1" identify the data registers which contain the respective operands. In this case, the opcode for the instruction "ls1.1

%d2, %d3" is "2523". If this opcode is received by the dispatcher 14, it can store the opcode in a predetermined register, and then call the semantic routine generator at address yyy. In response, the routine generator reads the first two digits of the opcode stored in the register, and uses them to locate the static semantic routine, i.e. the one corresponding to the opcode "2501". This can be done by reference to the dispatch table 16, for example. Once the semantic routine has been located, a copy is made.

In the copy, all occurrences of the processor register corresponding to the first operand, in this case %d0, are replaced with the register corresponding to %d2. Likewise, all occurrences of the processor register corresponding to the second operand, i.e. %d1, are replaced with the machine register corresponding to %d3. This is based on the third and fourth digits stored in the opcode register. This modified copy of the static semantic routine is then stored in the memory, and its address is entered into the dispatch table in place of the pointer to the semantic routine generator.

Figure 4:
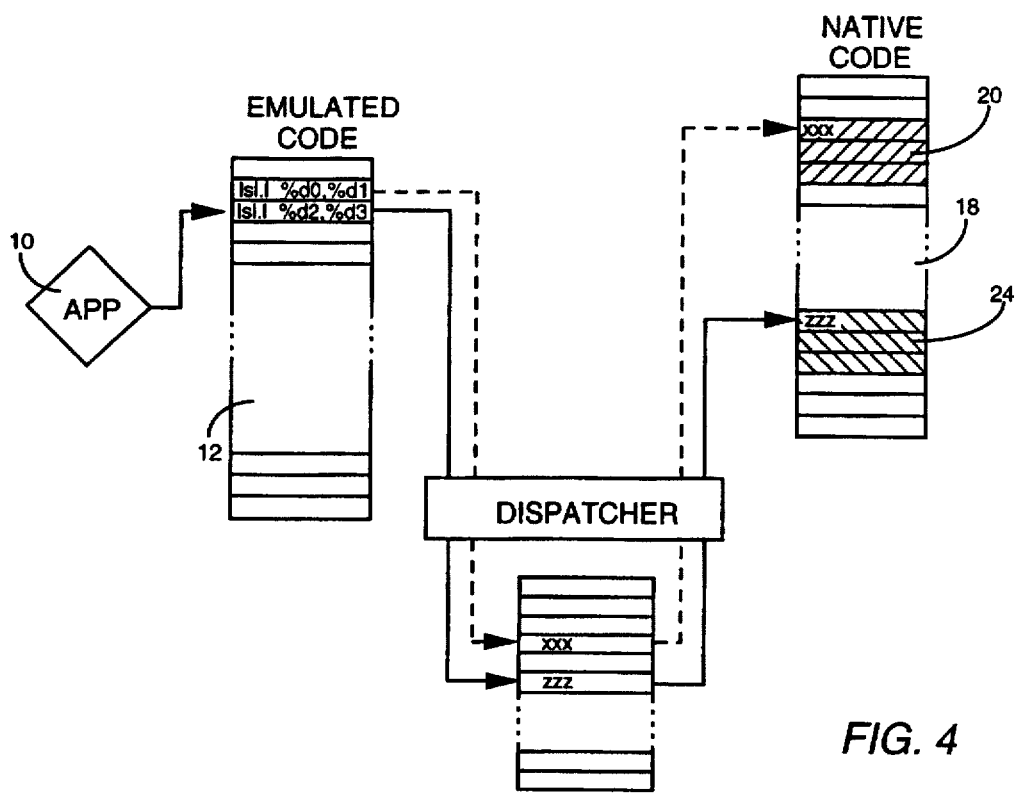
FIG. 4 is a block diagram similar to FIG. 2, illustrating the results of the dynamic routine generation.

Referring to FIG. 4, the dynamically generated semantic routine 24 has been stored at address zzz, and the dispatch pointer has been correspondingly updated. Subsequently, each time the emulated instruction 1s1.1 %d2, %d3 is issued by the application program, the dispatcher will call up the dynamically generated semantic routine stored at the new memory location zzz.

When a different two-operand instruction is issued in the emulated code, e.g. one to add the contents of two registers, the same semantic routine generator at address yyy is called. In this case, however, it does not copy the static semantic routine stored at address xxx, i.e. the shift left emulation. Rather, it utilizes the first two digits of the opcode stored in the register to employ a different static semantic routine as its template, namely the one which emulates the add instruction. In all other respects, however, the operation is the same as in the previously described example.

If an instruction with a different layout of operands is issued, a different semantic routine generator can be employed, to accommodate a different operand replacement operation. For example, if an operation has only one operand, such as an instruction to clear a register, the operand might be identified by either the third digit or the fourth digit of the opcode. In this case, the dispatch table entries for instructions in which the operand is identified by the third digit of the opcode would point to a particular semantic routine generator in the native code, and the entries for instructions in which the operand is identified by the fourth digit of the opcode could point to a different semantic routine generator specific to that type of instruction.

From the foregoing, therefore, it can be seen that the present invention dynamically generates semantic routines as needed during an emulation process, rather than statically storing all possible variations of an instruction type. With this approach, the amount of memory that is required for the emulator code can be significantly reduced. Furthermore, each semantic routine is only generated one time during an emulation, and is subsequently accessed directly from memory, thereby providing improved performance.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An emulator for emulating the functions of a first processor which executes a first set of instructions, each instruction of said first set of instructions having a type of operation and one or more associated operands, on a second processor which executes a second, different set of instructions, comprising:
   a set of static semantic routines in said second set of instructions, where each semantic routine emulates one instruction from said first set of instructions;
   a semantic routine generator in said second set of instructions which copies one of said static semantic routines and substitutes at least one different operand for an operand associated with the copied routine, to generate a new semantic routine; and
   a dispatch table which maps instructions in said first set of instructions to semantic routines in said second set of instructions, such that each instruction of a particular type in said first set which has a corresponding static semantic routine in said second set of instructions is mapped to its corresponding routine, and all other instructions of the same type are mapped to said semantic routine generator.

2. The emulator of claim 1 wherein said semantic routine generator replaces an entry in said dispatch table which is mapped to said semantic routine generator with a memory location at which a newly generated semantic routine is stored.

3. The emulator of claim 1 wherein each routine in said set of static semantic routines emulates a different type of operation.

4. The emulator of claim 3 wherein the operands associated with said static semantic routines are the same for all routines that emulate instructions having an identical operand format.

5. The emulator of claim 1 wherein different instructions in said first set of instructions have different respective formats for their associated operands, and wherein said emulator includes a plurality of semantic routine generators which respectively correspond to said different operand formats.

6. In a computer having a processor which executes instructions from a first set of instructions, a method for emulating the operation of a different processor which executes a second set of instructions, where the instructions from said second set include a plurality of types of operations each having one or more associated operands selected from a set of plural operands, comprising the steps of:
   statically storing in said first set of instructions a plurality of semantic routines, each of which emulates an instruction from said second set for a respective one of said plurality of types of operations that has one or more predetermined operands associated with it;
   issuing an instruction from said second set, which has at least one operand associated with it;
   executing a corresponding one of said statically stored semantic routines if the operand associated with said issued instruction is the same as the predetermined operand associated with the statically stored semantic routine;
   copying a statically stored semantic routine that pertains to the same type of operation as said issued instruction if the operand associated with the issued instruction is not the same as the predetermined operand associated with the corresponding statically stored semantic routine, and replacing the predetermined operand in the copy of the semantic routine with the operand associated with the issued instruction; and executing the copy of the semantic routine.

7. The method of claim 6 wherein the predetermined operands associated with said statically stored semantic routines are the same for all of said statically stored semantic routines that correspond to instructions with the same operand formats.

8. The method of claim 6 including the steps of addressing a dispatch table in response to the issuance of an instruction from said second set of instructions, where said dispatch table contains entries which map instructions in said second set which have said predetermined operands associated therewith to the corresponding statically stored routines in said first set, and which map instructions in said second set which do not have said predetermined operands to a routine for executing said copying and replacing step.

9. The method of claim 8 further including the step of changing an entry in said dispatch table from mapping an issued instruction to said copying and replacing routine to mapping said issued instruction to a location in memory at which the copy of the semantic routine is stored.

10. In a computer having a processor which executes instructions from a first set of instructions, a method for emulating the operation of a different processor which executes a second set of instructions, where at least some of the instructions from said second set include respective operations each having one or more associated operands, comprising the steps of:

statically storing in said first set of instructions a plurality of semantic routines, each of which emulates an instruction from said second set for an operation having one or more predetermined operands associated with it, and storing a semantic routine generator which generates new semantic routines by copying one of said statically stored semantic routines and substituting at least one other operand for the predetermined operands associated with the copied routine;

storing a dispatch table which maps instructions from said second set that pertain to operations having predetermined associated operands to corresponding statically stored routines in said first set, and which maps instructions from said second set that do not have said predetermined associated operands to said semantic routine generator in said first set of instructions;

issuing an instruction from said second set, which has at least one operand associated with it;

addressing said dispatch table in response to said issued instruction to determine a corresponding sequence of instructions in said first set;

executing a corresponding one of said statically stored semantic routines if the operand associated with said issued instruction is the same as the predetermined operand associated with the statically stored semantic routine; and executing said semantic routine generator if the operand associated with the issued instruction is not a predetermined operand, to generate a new semantic routine, and executing the new semantic routine.

11. The method of claim 10 further including the step of changing an entry in said dispatch table from mapping an issued instruction to said semantic routine generator to mapping said issued instruction to a location in memory at which the new semantic routine is stored.

12. A method for emulating the functions of a first processor which executes a first set of instructions, each instruction of said first set of instructions consisting of a type of operations and a plurality of associated operand permutations, on a second processor which executes a second different set of instructions, comprising the steps of:

storing a first semantic routine associated with a first operand permutation of a first instruction from the first set of instructions in a first memory location, wherein the first semantic routine includes a sequence of instructions in said second set of instructions for emulating the first operand permutation of the type of operation associated with the first instruction;

copying the first semantic routine into a second memory location;

substituting a second different operand permutation for the first operand permutation associated with the copied routine, and storing, in a third memory location, a semantic routine in said second set of instructions which copies the first semantic routine from the first memory location into the second memory location and substitutes the second difference operand permutation for the first operand permutation associated with the copied routine, to generate a new semantic routine.

13. The method of claim 12, further including the steps of:

storing a dispatch table which maps instructions in said first set of instructions to semantic routines in said second set of instructions, such that the first instruction associated with the first operand permutation is mapped to its corresponding routine, and all other instructions of the same type in the first instruction set are mapped to the third memory location.

* * * * *